United States Patent [19]

Smith

[11] 4,352,276
[45] Oct. 5, 1982

[54] CONSTANT VELOCITY UNIVERSAL JOINT WITH IMPROVED CENTERING DEVICE AND BOOT SEAL

[75] Inventor: Grant H. Smith, Rockford, Ill.

[73] Assignee: Borg-Warner Corporation, Chicago, Ill.

[21] Appl. No.: 216,225

[22] Filed: Dec. 15, 1980

[51] Int. Cl.³ .......................... F16D 3/26; F16D 3/30; F16D 3/84
[52] U.S. Cl. .................................... 464/109; 464/11; 464/117; 464/175
[58] Field of Search ................. 64/17 SP, 9 R, 14, 21, 64/17 R, 32 F

[56] References Cited

U.S. PATENT DOCUMENTS

| | | | |
|---|---|---|---|
| 1,868,540 | 7/1932 | Myers | 64/21 X |
| 3,324,683 | 6/1967 | Schroter | 64/21 |
| 4,107,952 | 8/1978 | Geisthoff | 64/32 F |
| 4,257,243 | 3/1981 | Herchenbach | 64/17 SP |
| 4,262,498 | 4/1981 | Krude | 64/32 F |

Primary Examiner—Edward J. McCarthy
Attorney, Agent, or Firm—Julian Schachner

[57] ABSTRACT

A constant velocity universal joint includes a centering device which restricts each cardan joint to mutually equal operating angles by the use of annular involute gear teeth designed to mesh in the homokinetic plane. A boot seal simultaneously flexes and rolls as the universal joint articulates to develop a kneading action which pumps lubricant among the gear teeth.

8 Claims, 5 Drawing Figures

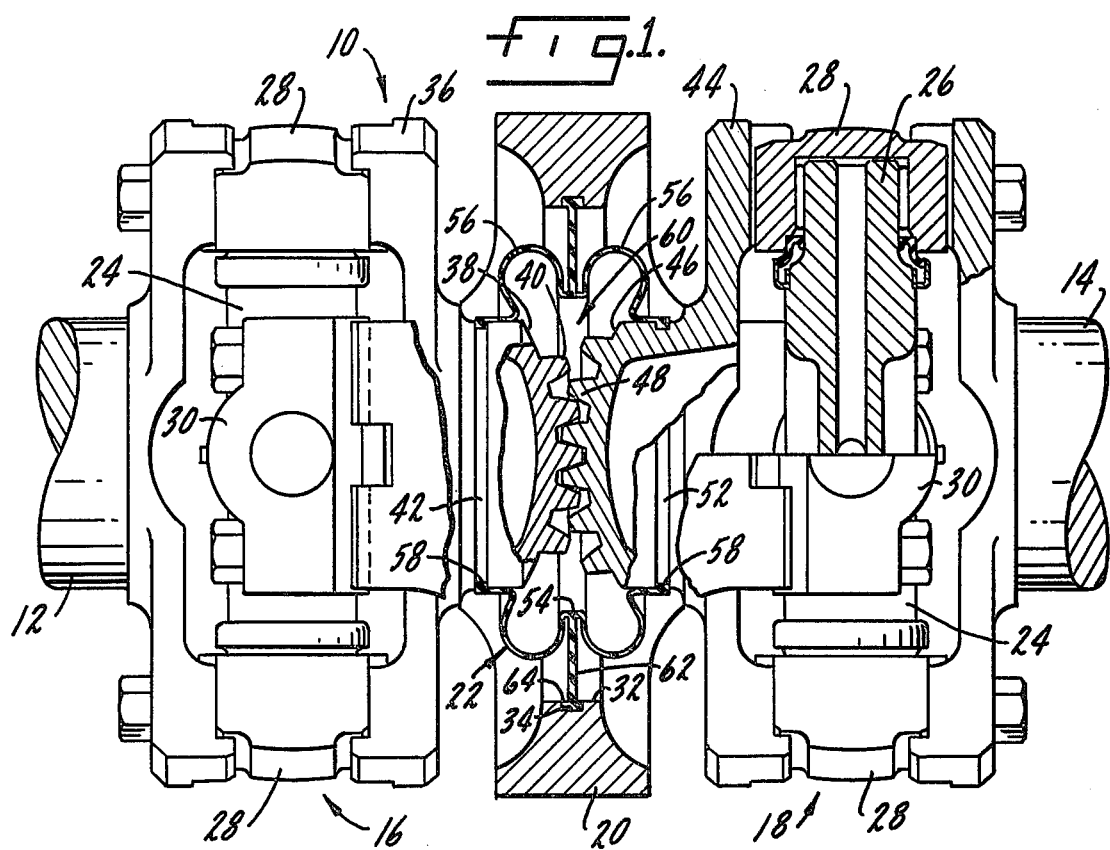
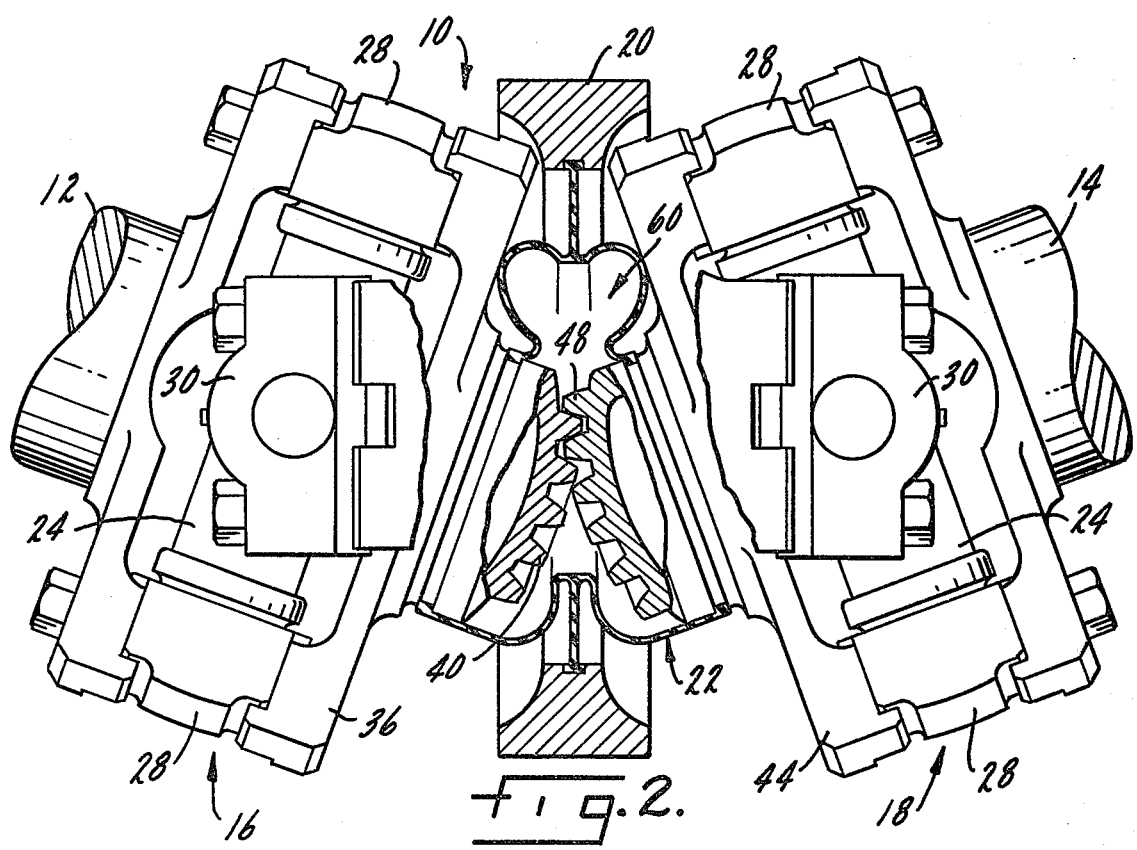

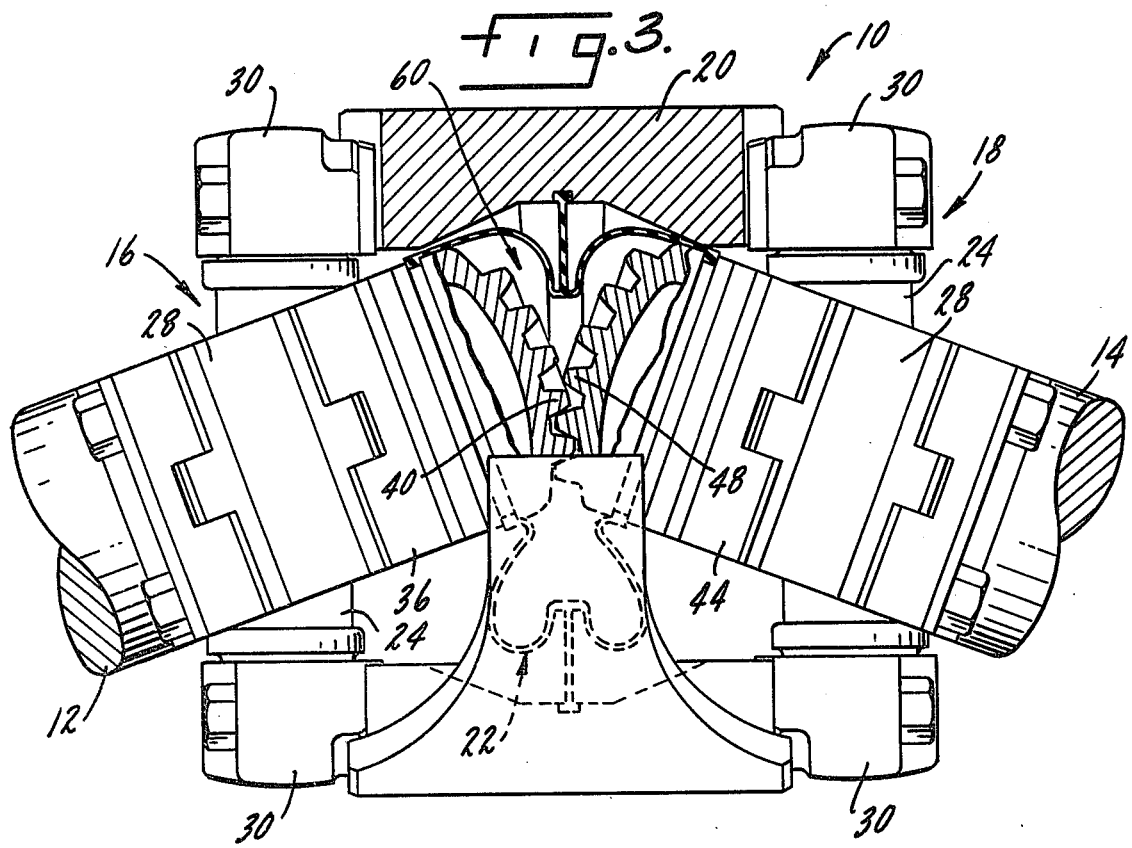
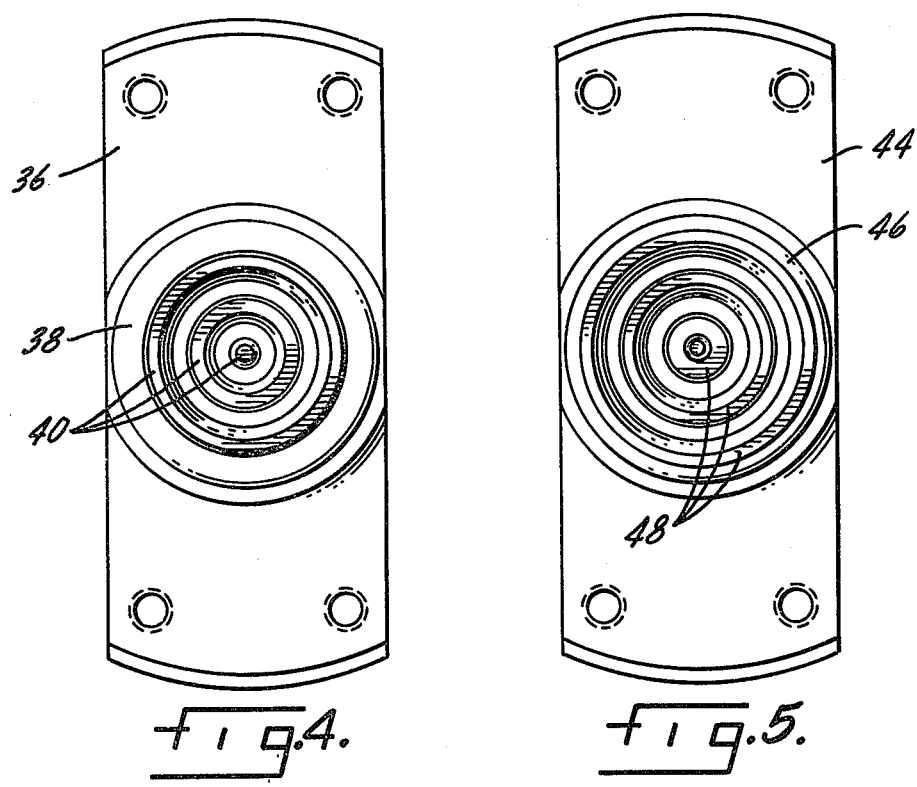

CONSTANT VELOCITY UNIVERSAL JOINT WITH IMPROVED CENTERING DEVICE AND BOOT SEAL

BACKGROUND OF THE INVENTION

This invention relates generally to a constant velocity universal joint. More particularly, it relates to a constant velocity universal joint having a gear type centering device and a boot type seal. The universal joint is applicable to any installation which requires power transfer between non-colinear members. It is particularly applicable for use in on- or off-highway vehicles.

A common universal joint used to transmit motion between two angularly misaligned rotating shafts is the cardan joint. There are however, many applications to which such a joint is not well suited. One such application is where the motion transmission characteristics of the cardan joint, which are non-uniform, result in unacceptable velocity fluctuation between the input and output shafts. One typical solution to this problem is to provide a pair of cardan joints properly phased so as to cancel such velocity fluctuations.

Where weight or size is of primary importance, or where geometry prevents the usual phasing, a constant velocity or double cardan universal joint normally is used. With such a universal joint, constant velocity is assured by the use of a centering device which restricts the associated cardan joints to mutually equal operating angles.

There remains a need in the art to provide a constant velocity universal joint which is smaller, lighter and more durable than universal joints previously known. There is also a need to provide a seal for the centering device of such a universal joint which will seal sufficiently well to retain and distribute lubricant and excluse contamination, thereby prolonging joint life.

SUMMARY OF THE INVENTION

The primary object of this invention is to meet one or mre of the needs noted above. To that end, there is provided a constant velocity universal joint which includes a pair of spiders having opposed bearing blocks to which are secured a pair of complementary gear yokes. The gear yokes define concentric annular gear teeth that mesh in the homokinetic plane. The universal joint also includes a coupling yoke secured to other opposed bearing blocks associated with the spiders. The yokes support the main portions of a boot seal in such a manner as to prevent its radial displacement due to centrifugal force, and yet allow it to create a kneading action which forces lubricant among the gear teeth.

The result is a simple, durable, long-wearing constant velocity universal joint of the double cardan type with an improved centering device and boot seal.

BRIEF DESCRIPTION OF THE DRAWINGS

The objects and advantages of this invention will become apparent to those skilled in the art upon consideration of the specification herein, including the drawings, wherein:

FIG. 1 is an elevational view of the constant velocity universal joint, partially cut away and partially in section to show details thereof;

FIG. 2 is an elevational view similar to FIG. 1, partially in section to show details thereof in an articulated position;

FIG. 3 is a plan view of the universal joint shown in FIG. 1, partially in section to show details thereof in an articulated position;

FIG. 4 is a detailed view showing one gear yoke; and

FIG. 5 is a detailed view showing the other gear yoke.

While this invention is susceptible of embodiment in many different forms, there is shown in the drawings and herein will be described in detail a preferred embodiment. It should be understood that the present disclosure is considered to be an exemplification of the principles of the invention, and is not intended to limit the invention to this embodiment.

DESCRIPTION OF A PREFERRED EMBODIMENT

Referring now to the drawings in greater detail, there is shown generally a constant velocity or double cardan universal joint 10 interconnecting two rotatable shafts 12 and 14. Universal joint 10 includes first and second simple cardan joints 16 and 18 respectively secured to shafts 12 and 14. A centering device includes a coupling yoke 20 which couples cardan joints 16 and 18 and functions to transmit the torsional load therebetween. Universal joint 10 also includes an improved boot seal 22.

Each cardan joint 16 and 18 includes a spider 24 having four spaced trunnions 26. Opposed pairs of bearing assemblies 28 and 30 are mounted respectively on trunnions 26. This arrangement permits relative rotary oscillation between each trunnion 26 and its associated bearing assembly 28 or 30. Bearing assemblies 28 are secured respectively to shafts 12 and 14. Coupling yoke 20 is secured to bearing assemblies 30.

Coupling yoke 20 defines an inner annular surface 32 in which is formed an inwardly facing annular groove 34. In a preferred form of the invention, groove 34 is oriented so as to be in the homokinetic plane.

A first gear yoke 36 is secured to associated bearing assemblies 28 of cardan joint 16. Yoke 36 defines a surface 38 of partial spherical configuration from which extend a pluarlity of concentric annular gear teeth 40. In a preferred form of the invention, teeth 40 have an involute cross section profile. Yoke 36 also defines an annular, outwardly facing groove 42.

A second gear yoke 44 is secured to associated bearing assemblies 28 of cardan joint 18. Yoke 44 defines a surface 46 of partial spherical configuration from which extend a plurality of concentric annular gear teeth 48. In a preferred form of the invention, teeth 48 have an involute cross sectional profile. Yoke 44 also defines an annular, outwardly facing groove 52.

The pitch lines of teeth 40 and 48 are spherical, and are tangent at the mesh point so that meshing is smooth and continuous as the angle of universal joint 10 changes. Contact between yoke 36 and 44 is restricted to a plane that includes the axes of shafts 12 and 14.

Improved boot seal 22 preferably is formed from a resilient material calculated to resist rupture caused by the aging effect of ozone and the solvent effect of lubricants. Boot seal 22 should remain resilient within a wide operating temperature range.

Boot seal 22 includes a central portion 54 and a pair of boot portions 56. Each boot portion 56 has at its outer end a thickened lip 58 similar to an "O" ring. Lips 58 are retained respectively in groove 42 of yoke 36 and groove 52 of yoke 44 to thereby define a chamber 60 within which teeth 40 and 48 are in meshing engagement. If desired, suitable straps may be provided to insure sealing retention of lips 58 respectively in grooves 42 and 52.

Central portion 54 is supported by an annular diaphragm portion 62 having a thickened outer lip 64 similar to an "O" ring. Outer lip 64 is retained in groove 34. Diaphragm portion 62 is sufficiently stiff so as to prevent central portion 54 from being forced off center laterally and/or reciprocatively by bending and rotational movements and universal joint 10 articulates.

As shown in FIGS. 1 and 2, boot portions 56 of boot seal 22 have a rolling action along the surfaces of yokes 36 and 44 and a simultaneous flexing action. This simultaneous rolling and flexing effectively develops a kneading action which pumps or forces lubricant within chamber 60 among gear teeth 40 and 48. This assures adequate lubrication for the gears.

It should be apparent to those skilled in the art that there is disclosed herein a constant velocity universal which is simple in concept, which is inexpensive and easy to manufacture and which, with relatively few sliding surfaces, extends significantly the useful working life of the universal joint. At the same time, the universal joint provides continuous constant velocity over its entire operating range.

The universal joint incorporates a gear type centering device. It also incorporates a boot seal which is held in place while being allowed to simultaneously roll and flex.

It is not intended that the present invention be restricted in its application to the particular universal joint shown herein by way of example. It is contemplated that the invention will be utilized in a wide variety of applications in which it is desirable to couple relatively movable parts.

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. A constant velocity universal joint for coupling first and second rotatable shafts, said constant velocity universal joint comprising first and second cardan joints respectively engaged with said first and second shafts, a centering device engaged with said first and second cardan joints, said centering device including first and second gear yokes defining first and second sets of annular gear teeth concentric about the axes of said first and second shafts, said gear teeth being constructed and arranged to mesh in the homokinetic plane, said centering device also including a coupling yoke defining an inwardly facing surface, and a boot seal having a central portion, first and second boot portions in sealing engagement respectively with said first and second gear yokes, and a diaphragm portion secured to said central portion and extending outwardly into sealing engagement with said surface, said boot seal being constructed and arranged such that said boot portions simultaneously flex and roll along said gear yokes as said universal joint articulates.

2. The invention of claim 1, said boot seal also being constructed and arranged such that said diaphram portion prevents said central portion from being moved laterally and/or reciprocatively by bending and rotational forces as said universal joint articulates.

3. The invention of claim 2, said diaphragm portion being relatively stiff as compared with said central and boot portions.

4. The invention of claim 3, said first and second gear yokes respectively defining first and second annular, outwardly facing grooves, said coupling yoke defining an annular, inwardly facing groove in the homokinetic plane, and said boot and diaphragm portions including lips at the ends thereof respectively sealingly engaged in said grooves.

5. In a universal joint including a centering device having a coupling member and first and second yokes engaged in the homokinetic plane; the improvement comprising a boot seal having a central portion, first and second boot portions extending from said central portion into sealing engagement respectively with said first and second yokes, and a diaphragm portion secured to said central portion and extending into sealing engagement with said coupling member, said boot seal being constructed and arranged to flex with said boot portions rolling on said yokes as said universal joint articulates.

6. The invention of claim 5, said coupling member defining an annular, inwardly facing surface, and said diaphragm portion extending outwardly from said central portion into sealing engagement with said surface.

7. The invention of claim 6, said diaphragm portion beng in said homokinetic plane.

8. The invention of claim 7, said diaphragm portion being stiff enough to restrain said central portion from lateral and/or reciprocative movement as said universal joint articulates.

* * * * *

UNITED STATES PATENT AND TRADEMARK OFFICE
CERTIFICATE OF CORRECTION

PATENT NO. : 4,352,276
DATED : October 5, 1982
INVENTOR(S) : Grant H. Smith

It is certified that error appears in the above—identified patent and that said Letters Patent is hereby corrected as shown below:

Column 1, lines 37-38, cancel "excluse" and insert -- exclude --.

Column 1, line 42, cancel "mre" and insert -- more --.

Column 2, line 42, cancel "pluarlity" and insert -- plurality --.

Column 2, line 44, cancel "section" and insert -- sectional --.

Column 3, line 10, cancel "and" and insert -- as --.

Column 4, line 45, cancel "beng" and insert -- being --.

Signed and Sealed this

Thirtieth Day of November 1982

[SEAL]

Attest:

Attesting Officer

GERALD J. MOSSINGHOFF
Commissioner of Patents and Trademarks